United States Patent [19]

Hladik et al.

[11] Patent Number: 5,208,839
[45] Date of Patent: May 4, 1993

[54] SYMBOL SYNCHRONIZER FOR SAMPLED SIGNALS

[75] Inventors: Stephen M. Hladik, Albany; Richard C. Gaus, Jr., Burnt Hills, both of N.Y.

[73] Assignee: General Electric Company, Schenectady, N.Y.

[21] Appl. No.: 706,604

[22] Filed: May 28, 1991

[51] Int. Cl.$^5$ .............................................. H04L 7/02
[52] U.S. Cl. ...................................... 375/110; 375/120
[58] Field of Search ................. 375/110, 113, 81, 119, 375/120, 82; 328/133, 63, 191, 139; 341/69, 70; 360/41, 50

[56] References Cited

U.S. PATENT DOCUMENTS

| | | | |
|---|---|---|---|
| 3,656,064 | 4/1972 | Giles et al. | 375/82 X |
| 3,729,684 | 4/1973 | Shuda | 375/82 X |
| 4,805,197 | 2/1989 | Vau Der Jagt et al. | 375/110 |

Primary Examiner—Curtis Kuntz
Assistant Examiner—Tesfaldet Bocure
Attorney, Agent, or Firm—Jill M. Breedlove; Marvin Snyder

[57] ABSTRACT

A symbol synchronizer derives a symbol clock reference from a sampled baseband signal which may be of a variety of suitable digital signalling formats, including non-return-to-zero (NRZ) and Manchester formats. A one-bit quantizer receives the sampled signal and provides a binary representation thereof to a level-transition detector which generates a sequence of pulses at the symbol rate of the binary-valued data sequence and at a predetermined timing offset from the symbol timing epochs of the data sequence. The timing offset depends on the digital signalling format and is on the interval $$\left[\frac{-T}{2}, \frac{T}{2}\right],$$

where T is the symbol period. The level-transition detector employs delay circuitry, logic circuitry, and a monostable multivibrator to mask transitions in the quantized data sequence that do not occur at the predetermined timing offset from the timing epochs and to generate the symbol clock pulse sequence. The output pulse sequence from the level-transition detector is applied to a binary-quantized digital phase-locked loop (DPLL) which functions to stabilize the data-derived symbol clock. The average pull-in time of the digital phase-locked loop is reduced by the incorporation of a synchronization acquisition aid which automatically pulls the DPLL into synchronization if the estimated symbol clock timing epoch lies within a lock window a predetermined number of times.

16 Claims, 10 Drawing Sheets

SYMBOL SYNCHRONIZER FOR SAMPLED SIGNALS

FIELD OF THE INVENTION

The present invention relates generally to symbol synchronizers for digital communications receivers. More particularly, the present invention relates to a symbol synchronizer capable of deriving a symbol clock reference from a sampled signal which may be of a variety of suitable digital signalling formats.

BACKGROUND OF THE INVENTION

Recent emphasis in radio receiver/modem technology research has focused on the utilization of digital signal processing to demodulate signals. Communication using digital modulation techniques requires that the receiver be able to accurately identify the symbol timing epoch, i.e., the optimum sampling point on a waveform for symbol detection. Presently, symbol synchronization is generally derived from an analog signal using analog and/or digital circuits. That is, symbol synchronizer implementations typically use a continuous-time data signal to derive a symbol clock. Even so-called digital synchronizer structures and commercially available digital phase-locked loops process continuous-time rather than sampled, or discrete-time, signals to derive the symbol timing reference. However, the aforementioned recent interest in digital, i.e. sampled, demodulation techniques has made it desirable to provide symbol synchronizers that derive the required symbol clock reference from a discrete-time, rather than continuous-time, signal. To be practicable, such a symbol synchronizer should provide a stable symbol clock reference even under noisy or lengthy transmission conditions. Furthermore, it is desirable that such symbol synchronizer structures be capable of being implemented using either VLSI technology or microprocessor code.

OBJECTS OF THE INVENTION

Accordingly, an object of the present invention is to provide a new and improved symbol synchronizer.

Another object of this invention is to provide a symbol synchronizer for deriving a symbol clock reference from a sampled signal which may be of any suitable digital signalling format, including non-return-to-zero (NRZ) and Manchester formats.

Still another object of this invention is to provide a simple logic-based symbol synchronizer which can be implemented using VLSI technology or microprocessor code.

Yet another object of this invention is to provide a symbol synchronizer which rapidly acquires synchronization via robust acquisition-aiding means.

SUMMARY OF THE INVENTION

The foregoing and other objects of the present invention are achieved in a new and improved symbol synchronizer for deriving a symbol clock reference from a sampled baseband signal which may be of a variety of suitable digital signalling formats, including non-return-to-zero (NRZ) and Manchester formats. According to the present invention, a one-bit quantizer receives the sampled signal and provides a one-bit representation thereof to a level-transition detector which generates a logical pulse sequence comprising pulses at the symbol rate of the data sequence and at a predetermined timing offset from the symbol timing epochs of the data sequence. The timing offset depends on the type of signalling format employed and is on the interval $$\left[\frac{-T}{2}, \frac{T}{2}\right].$$

where T is the symbol period. As examples, for a Manchester signalling format, the pulses generated by the level-transition detector are in phase with the timing epochs of the data sequence so that the timing offset is equal to zero; but for NRZ signalling, the timing offset is equal to one-half symbol. In a preferred embodiment, the level-transition detector employs delay means, logic circuitry, and a monostable multivibrator to mask transitions in the quantized data sequence that do not occur at the predetermined timing offset from the timing epochs and to generate the symbol clock pulse sequence.

In order to provide a sufficiently reliable symbol clock even in the event of, for example, thermal noise, the output pulse sequence from the level-transition detector is applied to a binary-quantized digital phase-locked loop (DPLL) which functions to stabilize the data-derived symbol clock. The DPLL comprises a binary phase detector, a loop filter and a digitally controlled oscillator (DCO). The binary phase detector preferably comprises a clocked counter that is enabled by the receipt of a logic pulse from the DCO. A logic pulse from the level-transition detector dumps and then resets the counter's accumulated count with the result that the count is proportional to the timing difference between the data-derived transition pulse and the DCO's symbol timing pulse. The binary phase detector's decoding logic generates a lead or lag signal, depending on whether the DCO's symbol timing pulse leads or lags the data-derived transition pulse, respectively. The lead or lag signal is provided to a loop filter, preferably comprising a random walk filter, which in turn provides a retard or advance signal to the DCO in order to respectively retard or advance the symbol clock's phase. According to a preferred embodiment, the DCO comprises logic circuitry for receiving the advance and retard signals and generating a signal to an accumulator indicating whether the DCO clock timing is to be advanced, retarded or maintained. A count decoder receives the output signal from the accumulator and provides the synchronized symbol clock pulses. Advantageously, the DCO prevents an undesirable loss or repetition of a clock pulse when the DCO clock phase is changing to lock to the data's symbol clock.

In another aspect of the present invention, the average pull-in time of the digital phase-locked loop is reduced by the incorporation of a synchronization acquisition aid. In operation, the synchronization acquisition aid determines whether the estimated symbol timing epoch generated by the DCO lies within a predetermined "lock window". If the local estimate of the symbol clock lies outside of the lock window a predetermined number of consecutive times, a signal is sent to the DCO to set the DCO's accumulator to a predetermined state which causes the clock generated by the DCO to be in synchronism with the current pulse received from the transition detector.

BRIEF DESCRIPTION OF THE DRAWINGS

The features and advantages of the present invention will become apparent from the following detailed description of the invention when read with the accompanying drawings in which.

DETAILED DESCRIPTION OF THE INVENTION

Figure 1:
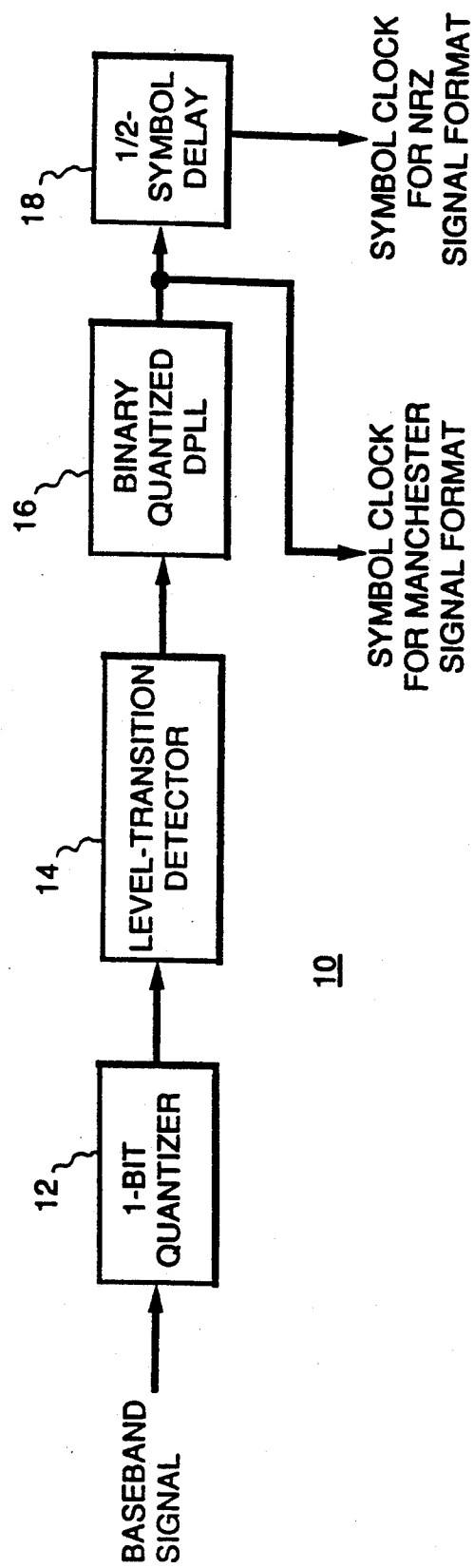
FIG. 1 is a simplified functional block diagram of the symbol synchronizer according to a preferred embodiment of the present invention.

FIG. 1 is a functional block diagram illustrating a symbol synchronizer 10 according to a preferred embodiment of the present invention. As shown, symbol synchronizer 10 comprises a one-bit quantizer 12, a level-transition detector 14, and a binary-quantized digital phase-locked loop (DPLL) 16. For purposes of illustration, the output signal of the binary-quantized DPLL is shown as the symbol clock for a Manchester signalling format and as the symbol clock, via a one-half symbol delay block 18, for a non-return-to-zero (NRZ) signalling format. The reason for the one-half symbol delay block for NRZ signalling is that, in the absence of noise, NRZ transitions can only occur at the symbol boundaries which are one-half symbol from the timing epochs of the NRZ signals.

In accordance with the present invention, a sampled data signal at baseband is initially quantized to a one-bit representation by one-bit quantizer 12. This one-bit quantizer 12 can be implemented simply as a comparator or a hard-limiter. The one-bit output signal from one-bit quantizer 12 is supplied to level-transition detector 14.

Figure 2:
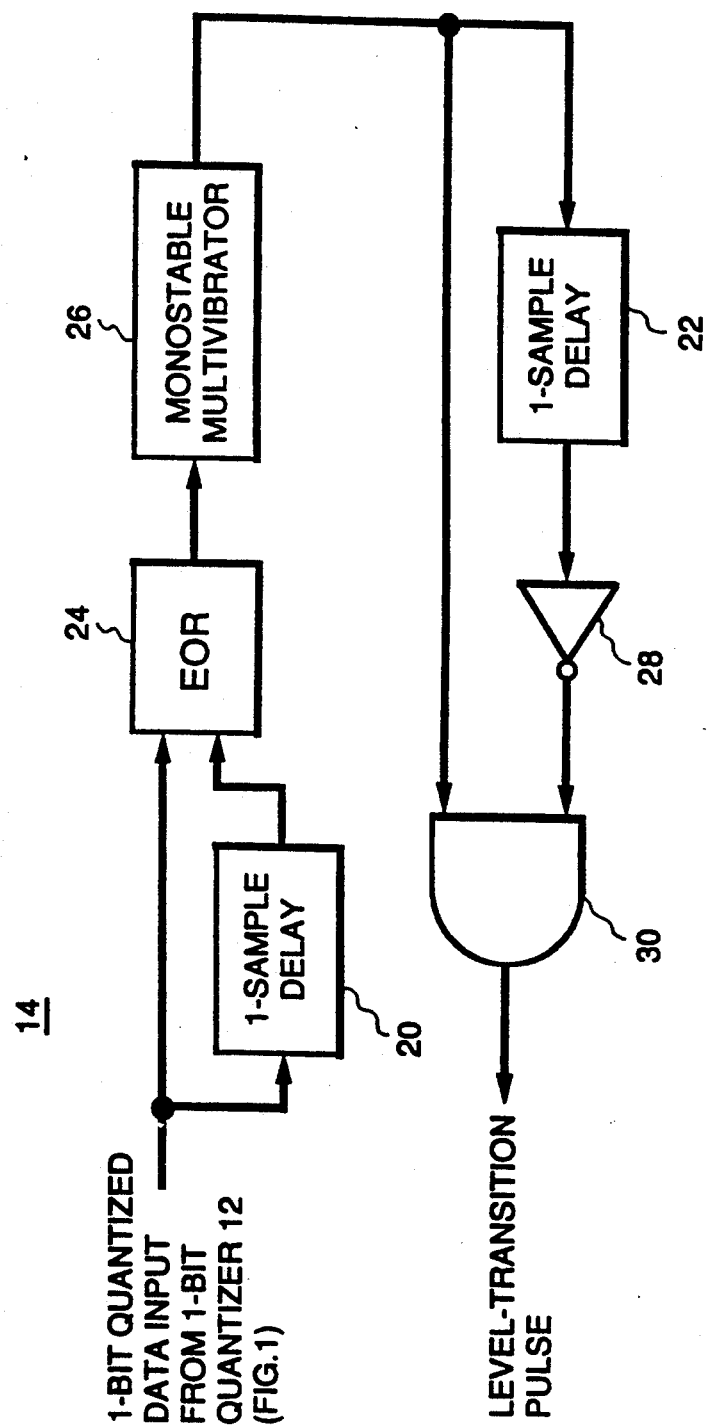
FIG. 2 is a functional block diagram of a level-transition detector useful in the symbol synchronizer of FIG. 1.

A functional block diagram of level-transition detector 14 is shown in FIG. 2. In accordance with the present invention, the level-transition detector generates a logical pulse sequence comprising pulses at the symbol rate of the data sequence and at a predetermined timing offset from the symbol timing epochs of the data sequence. The timing offset depends on the type of signalling format employed and is on the interval $$\left[\frac{-T}{2}, \frac{T}{2}\right],$$

where T is the symbol period. As illustrated, level-transition detector 14 comprises two one-sample delays 20 and 22, an exclusive OR-gate 24, a monostable multivibrator 26, an inverter-gate 28, and a two-input AND-gate 30. The level-transition detector observes the quantized data sequence and produces one logic pulse each time a logic level transition occurs therein, provided that the multivibrator output signal triggered by the previous transition has returned to logic level 0. Specifically, as shown in FIG. 2, the one-bit quantized data signal from one-bit quantizer 12 (FIG. 1) is provided both directly and via one-sample delay 20 to exclusive-OR gate 24. The output signal from exclusive-OR gate 24 is supplied to multivibrator 26. The resultant logical pulse sequence from multivibrator 26 is provided to inverter 28 via one-sample delay 22. The output signal from inverter 28 is provided as an input signal to AND-gate 30. The other input signal to AND-gate 30 is the logical pulse sequence directly from multivibrator 26.

Figure 3:
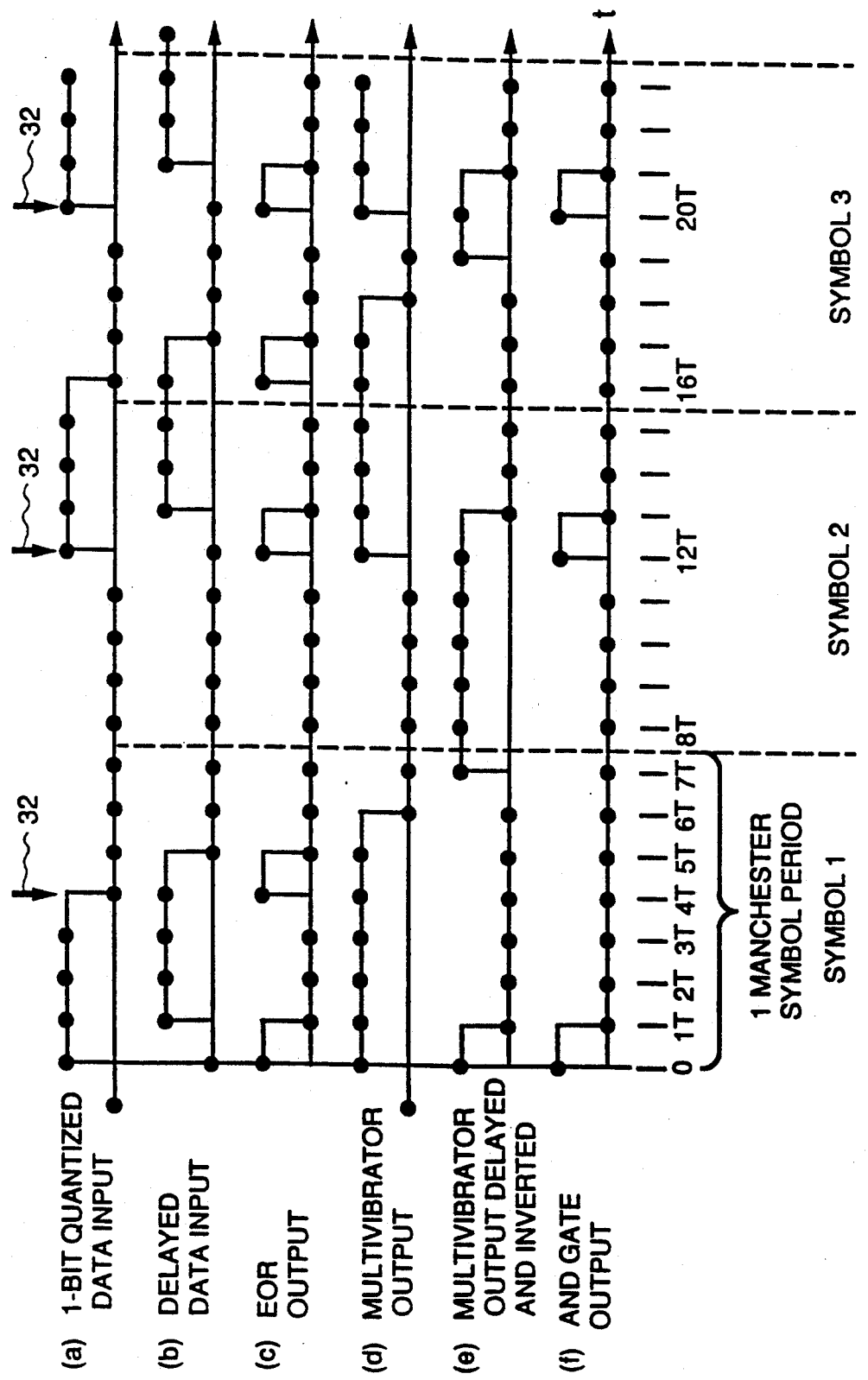
FIG. 3 is a timing diagram illustrating operation of the level-transition detector in accordance with the present invention.

To illustrate operation of the level-transition detector in accordance with the present invention, FIG. 3 shows: (a) a discrete-time, quantized data input signal to level-transition detector 14 from one-bit quantizer 12 (FIG. 1); (b) the output signal from one-sample delay 20; (c) the output signal from exclusive-OR gate 24; (d) the logical pulse sequence from monostable multivibrator 26; (e) the multivibrator output signal delayed and inverted (i.e., the output signal from inverter 28); and (f) the transition pulse signal (i.e., the AND-gate output signal). By way of example, the quantized data input signal to level-transition detector 14 is shown as having a Manchester signalling format. For a Manchester signalling format, the pulses generated by the level-transition detector are in phase with the timing epochs so that the timing offset is equal to zero. (However, other suitable digital signalling formats may be used, such as a non-return-to-zero (NRZ) format with a timing offset equal to one-half symbol.) For the particular example of FIG. 3, T represents the sampling interval, and 8T is the symbol period. The desired symbol timing epochs are denoted by arrows 32.

As shown in FIG. 3, the one-bit quantized input data signal is delayed by one sample interval T via block 20 (FIG. 2). An exclusive-OR function is applied by gate 24 to the combination of the data signal and the delayed data signal to provide the monostable multivibrator input signal (FIG. 3(c)). In accordance with the present invention, as illustrated by the timing diagram in FIG. 3(d), the monostable multivibrator acts to mask transitions in the input data sequence which occur at times other than at the predetermined offset from the desired symbol timing epochs 32, which offset is equal to zero for a Manchester signalling format, as illustrated. These transitions can be attributed to the chosen signalling format (e.g., the illustrated Manchester waveform), or they can result from signal noise. The multivibrator output signal is delayed and inverted by function blocks 22 and 28, respectively, to provide the signal represented in FIG. 3(e). Finally, the logical pulse sequence from monostable multivibrator 26 and the delayed and inverted multivibrator output signal are applied as input signals to AND-gate 30 in order to provide level-transition pulses at the desired symbol timing epochs, as shown in FIG. 3(f). As is evident from FIG. 3(f), the synchronizer is initially out-of-phase with the received data sequence. However, the synchronizer pulls into synchronization following the first transition in the symbol sequence represented by the Manchester waveform. That is, in the particular example of FIG. 3, the pulses in the sequence of FIG. 3(f) are synchronous with the timing epochs 32 of the data sequence of FIG. 3(a) as of the second symbol, i.e. "Symbol 2". It will be appreciated by those of skill in the art that the need for a symbol polarity reversal in order to achieve synchronization is a result of using a Manchester signalling format.

The sequence of pulses from the level-transition detector does not provide a sufficiently reliable symbol clock, however. For example, in the case of NRZ signalling, random data patterns lead to the frequent absence of transitions in the quantized baseband data sequence. Furthermore, thermal noise can result in the generation of spurious transitions in the input data sequence. Hence, in accordance with the present invention, a digital phase-locked loop (DPLL) is employed to stabilize the data-derived symbol clock.

Figure 4:
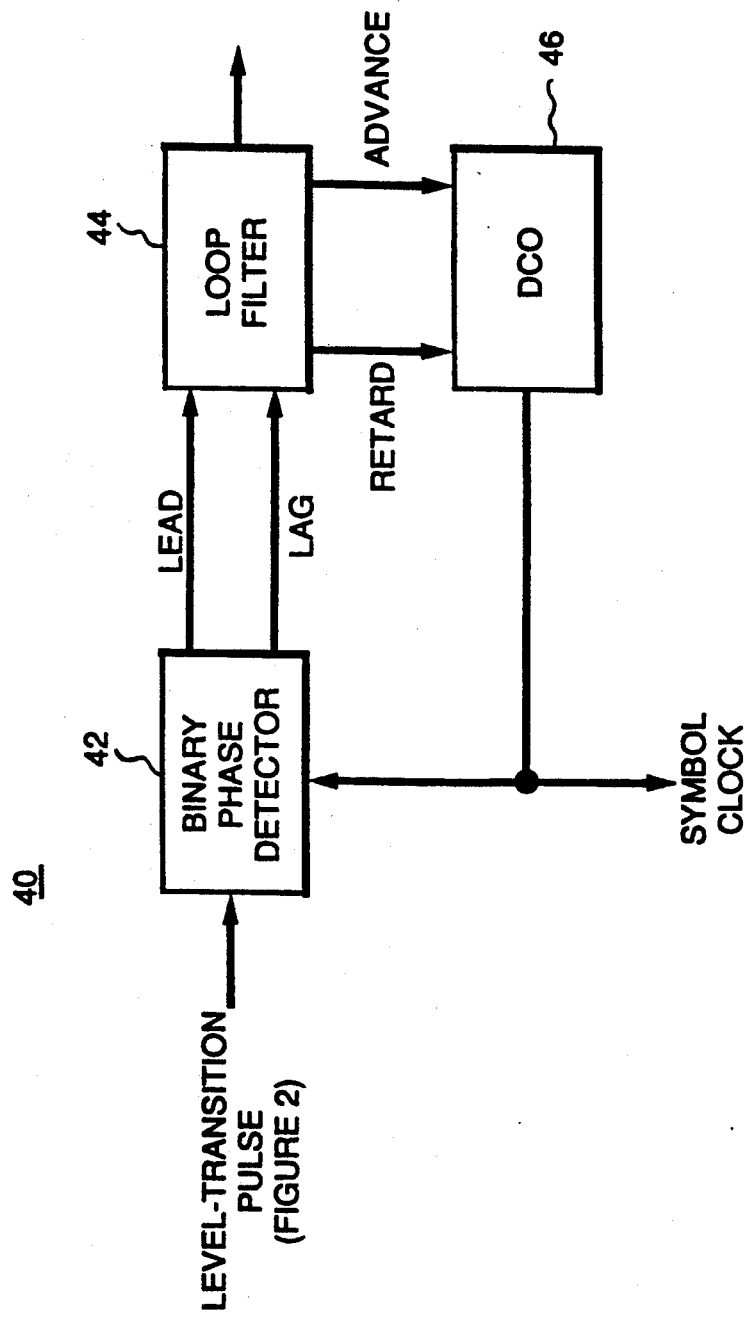
FIG. 4 is a block diagram of a preferred embodiment of a binary-quantized digital phase-locked loop useful in the symbol synchronizer of the present invention.

A preferred embodiment of a binary-quantized DPLL 40 useful in the symbol synchronizer of the present invention is shown schematically in FIG. 4. As shown, DPLL 40 comprises a binary phase detector 42, a loop filter 44 and a digitally controlled oscillator (DCO) 46. In operation, the binary phase detector determines whether the symbol clock from the DCO leads or lags the level-transition pulse from the level-transition detector (FIG. 2), and the loop filter provides a feedback signal to the DCO for advancing or retarding the phase of the symbol clock accordingly.

Figure 5:
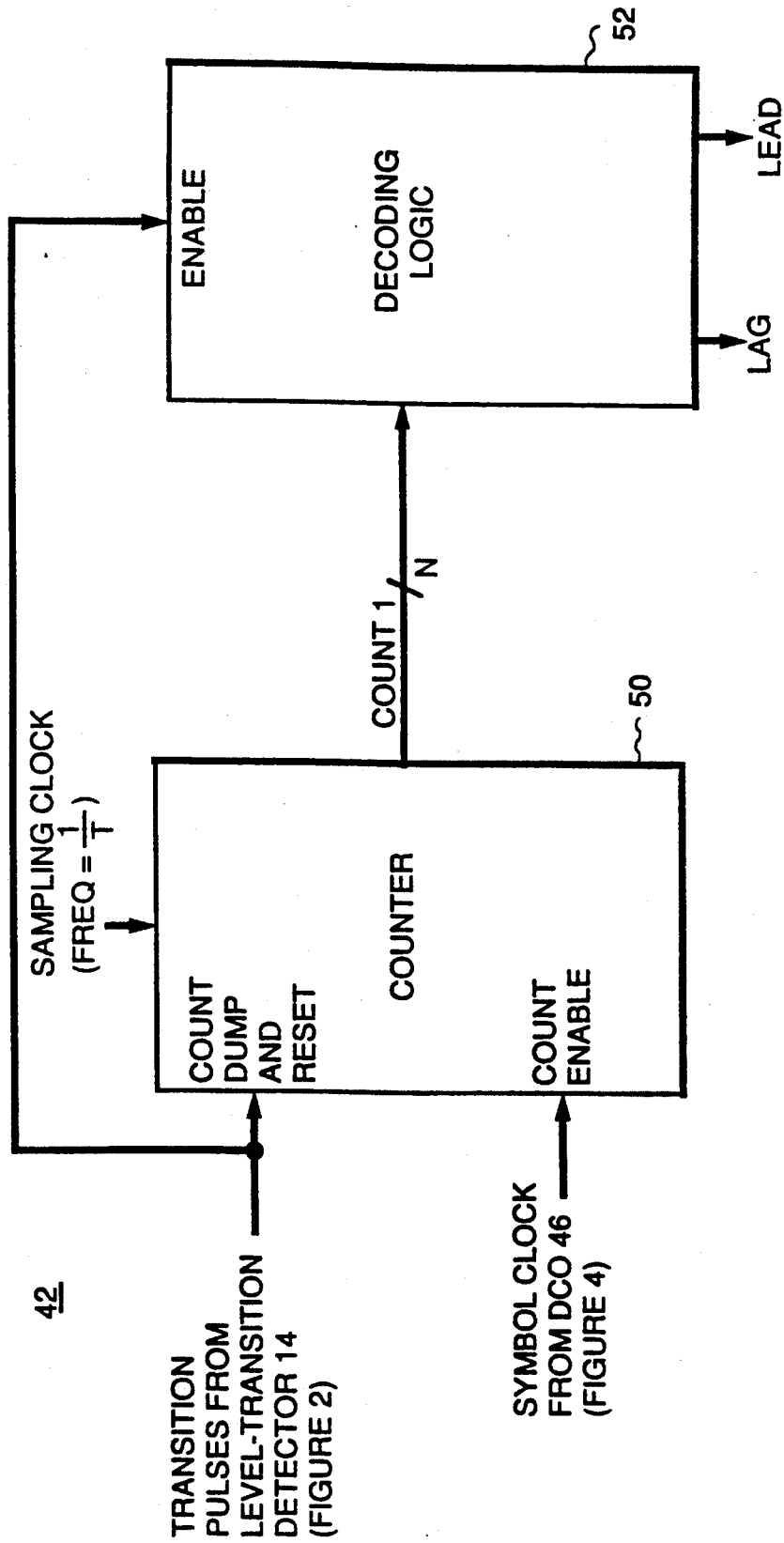
FIG. 5 is a block diagram of a binary phase detector useul in the symbol synchronizer of the present invention.

A preferred implementation of binary phase detector 42 is shown in FIG. 5. Specifically, the binary phase detector preferably comprises a clocked counter 50 that is enabled by the receipt of a logic pulse from the DCO. The counter is clocked at the sampling frequency $$\frac{1}{T}.$$

A logic pulse from level-transition detector 14 (FIG. 2) dumps and then resets this counter's accumulated N-bit count COUNT1. Accordingly, this count signal COUNT1 is proportional to the timing difference between the data-derived transition pulse and the DCO's symbol timing pulse. The count COUNT1 is decoded by a logic block 52 to determine whether the DPLL's symbol clock is leading or lagging the transition pulse derived from the quantized data sequence. The decoding logic of block 52 may be implemented in a variety of ways as will be appreciated by those of skill in the art of digital logic circuits.

Figure 6:
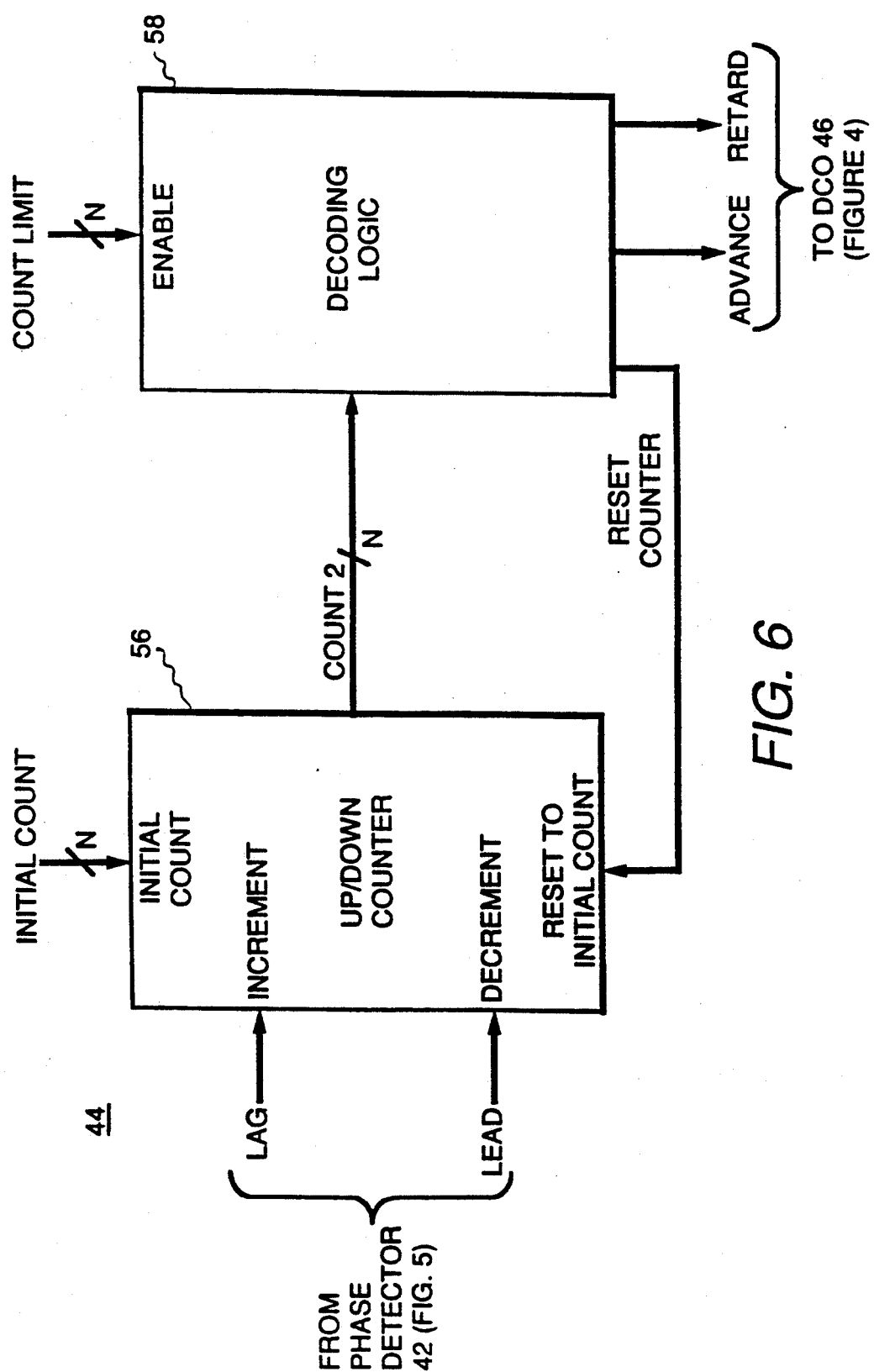
FIG. 6 is a block diagram of a loop filter useful in the digital phase-locked loop of FIG. 4.

FIG. 6 illustrates a preferred embodiment of loop filter 44 which controls the dynamics of the phase-locked loop. In particular, loop filter 44 is preferably a random walk filter. As shown in FIG. 6, the random walk filter is implemented as an up/down counter 56 that is incremented by pulses on the "lag" signal line and decremented by pulses on the "lead" signal line from phase detector 42 (FIG. 5). As shown in FIG. 6, the count signal COUNT2 from the up/down counter is decoded by a logic block 58. If COUNT2 reaches a specified lower or upper limit, a single pulse is produced on the "retard" or "advance" line, respectively, and the up/down counter is reset.

Figure 7:
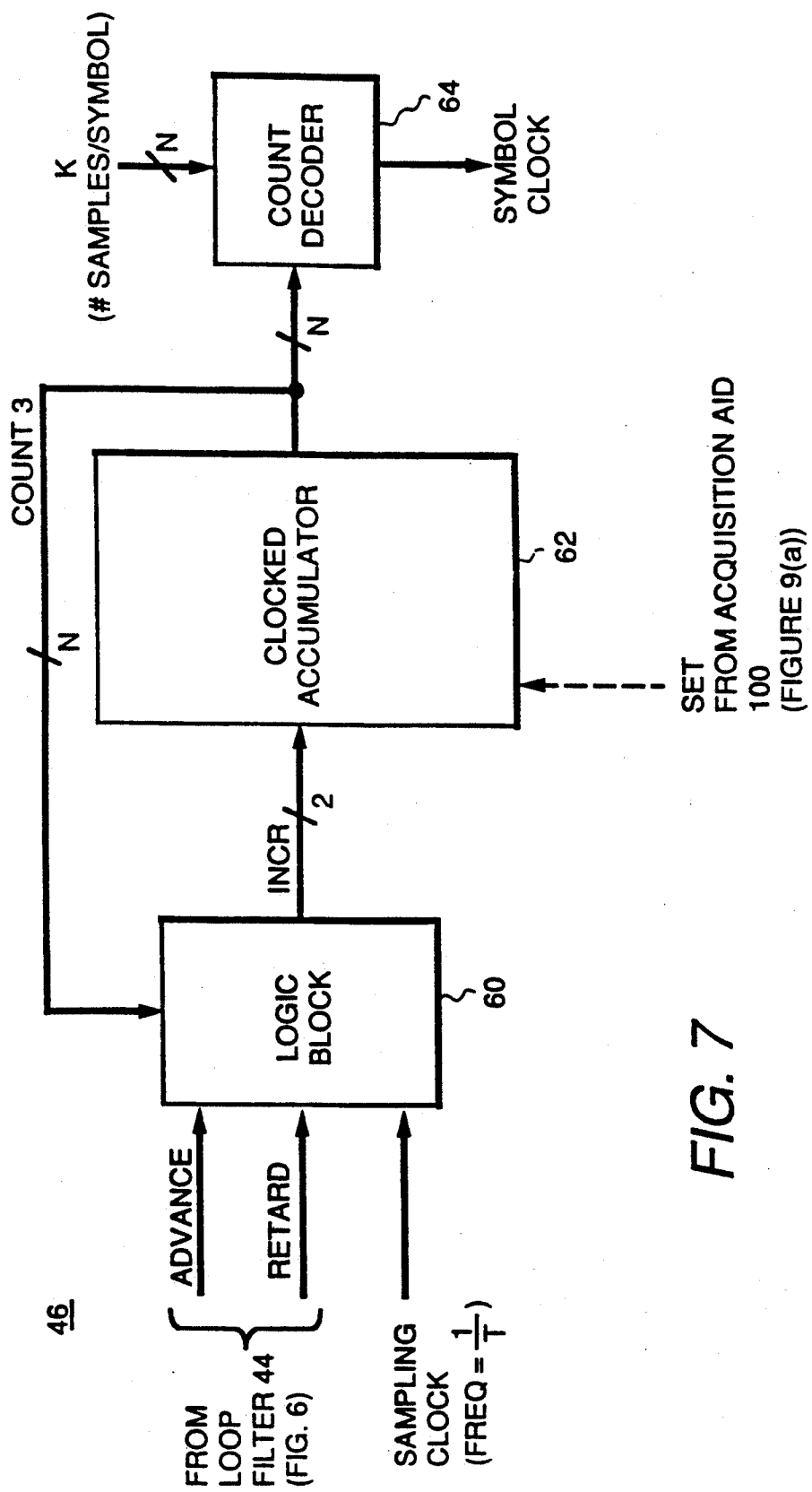
FIG. 7 illustrates a preferred embodiment of a digitally controlled oscillator useful in the symbol synchronizer of the present invention.

FIG. 7 illustrates a preferred embodiment of DCO 46 useful in the symbol synchronizer of the present invention. A logic block 60, which is clocked at the sampling frequency $$\frac{1}{T},$$

receives the advance and retard signals from random walk filter 44 (FIG. 6) and a count signal COUNT3 from an accumulator 62, and generates an increment signal INCR indicating whether the symbol clock phase is to be advanced, retarded or maintained. The accumulator 62 accumulates the two-bit values on the INCR output line from logic block 60.

Figure 8:
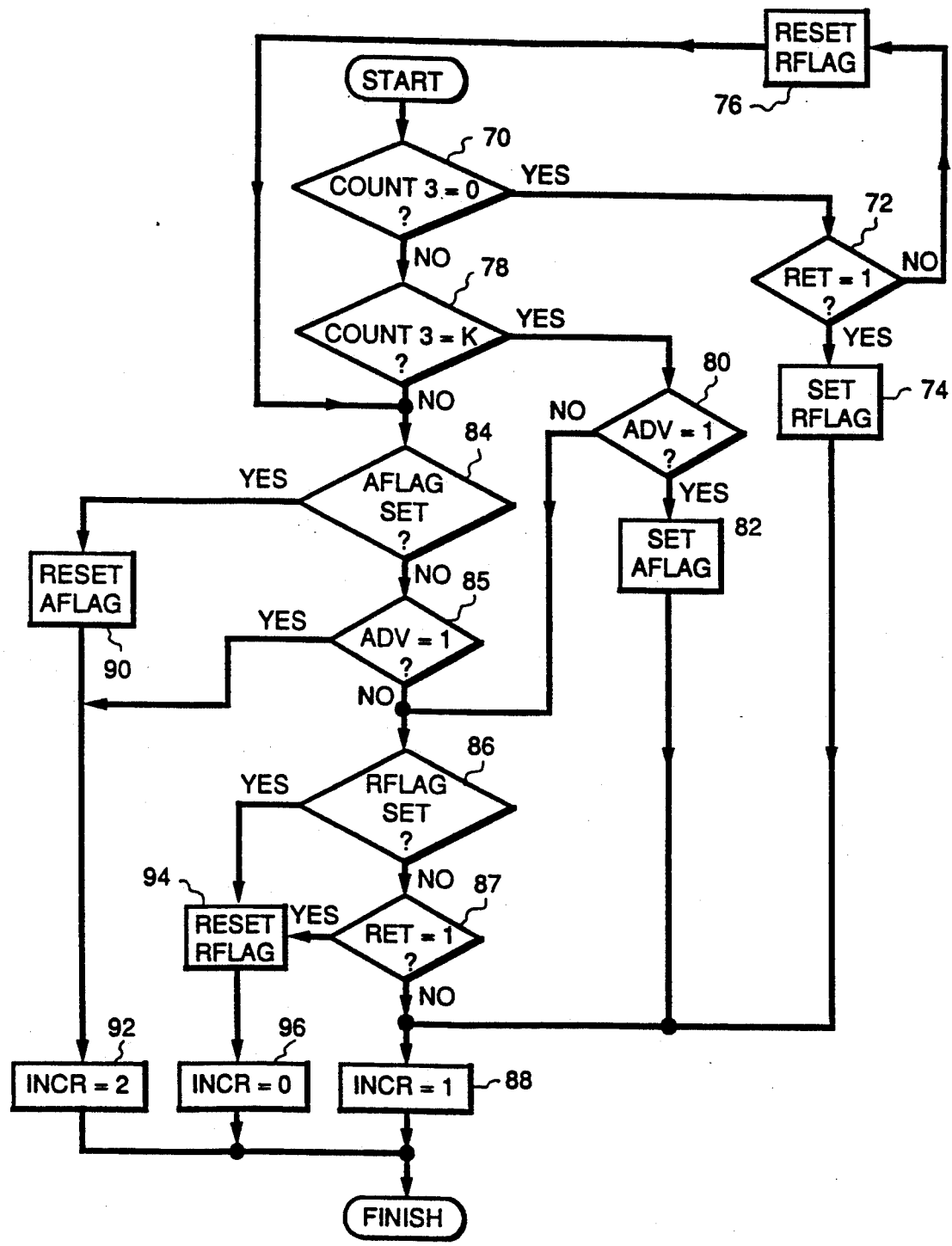
FIG. 8 is a flow chart illustrating operation of the logic block of the digitally controlled oscillator of FIG. 7.

The flow chart of FIG. 8 shows how logic block 60 determines the value of the INCR signal. In step 70, a test is made to determine whether the COUNT3 signal at the output of accumulator 62 (FIG. 7) is equal to zero. If COUNT3=0, then another test is made in step 72 to determine whether the signal on the "retard" input line (RET) is equal to logic level one. If the test of step 72 is positive, then a retard flag RFLAG is set in step 74 and operation proceeds to step 88, described hereinbelow. If, on the other hand, the test of step 72 is negative, then RFLAG is reset in step 76 and operation proceeds to step 84, described hereinbelow. If COUNT3 is not equal to zero, as determined in step 70, then a test is made in step 78 to determine whether COUNT3 is equal to a reference count K, where K is equal to the number of samples per symbol. If COUNT3=K, then a test is made in step 80 to determine whether the signal on the "advance" input line (ADV) is equal to logic level one. If the test of step 80 is positive, then an advance flag AFLAG is set in step 82 and operation proceeds to step 88. If the test of step 80 is negative, then operation proceeds to step 86, described hereinbelow. If COUNT3 does not equal the number of samples per symbol K, as determined in step 78, then a test is made in step 84 to determine whether AFLAG has been set. If AFLAG has not been set, another test is made in step 85 to determine whether the signal on the advance line is equal to logic level one. If the signal on the advance line is equal to logic level one, then operation proceeds to step 92 wherein the value of the INCR signal is set equal to two, with the result that the accumulator is incremented by two, and the symbol clock is thereby advanced by one sampling interval. If the test of step 85 is negative, then a test is made in step 86 to determine whether RFLAG has been set. If RFLAG has not been set, then a test is made in step 87 to determine whether the signal on the retard line is equal to logic level one. If not, the value of the INCR signal is set equal to one in step 88, with the result that the accumulator is incremented by one, and the symbol clock phase is maintained. On the other hand, if the signal on the retard line is equal to logic level one, then RFLAG is reset in step 94 and operation proceeds to step 96, wherein the value of the INCR signal is set equal to zero, with the result that the state of the accumulator remains unchanged, and the symbol clock is thereby retarded by one sampling interval. Similarly, if in step 86 it has been determined that RFLAG has been set, then RFLAG is reset in step 94, and the INCR signal is set equal to zero in step 96. Referring back to step 84, if AFLAG has been set, then AFLAG is reset in step 90, and the INCR signal is set equal to two in step 92. As a result, the state of the accumulator is incremented by two, and the symbol clock is advanced by one sampling interval T.

Advantageously, by employing the advance and retard flags AFLAG and RFLAG, respectively, as described hereinabove, the algorithm represented by the flow chart of FIG. 8 prevents the unintended loss or repetition of a clock pulse when the DCO clock phase is changing to lock to the data's symbol clock.

As shown in FIG. 7, the DCO of the present invention also includes a count-decoder 64 which receives the count signal COUNT3 from accumulator 62 and the reference count K, i.e., the number of samples per symbol, and generates the symbol clock signal therefrom. In particular, the count-decoder logic produces a logic-level "1" sample when the accumulator generates a COUNT3 signal equal to zero and a logic-level "0" sample otherwise. The count-decoder logic may be implemented in a variety of ways as will be appreciated by those of skill in the art of digital logic circuits.

Figure 9A:
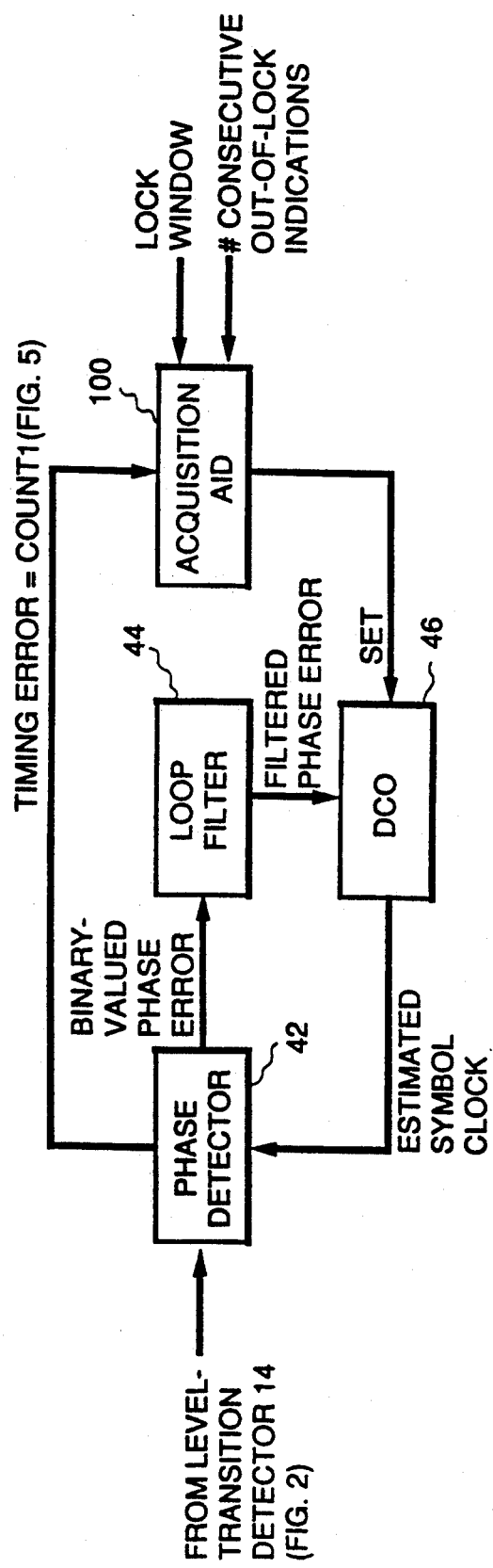
FIG. 9(a) is a block diagram illustrating the incorporation of a phase-lock acquisition aid useful in the symbol synchronizer of the present invention.

In accordance with another aspect of the present invention, the average pull-in time of the digital phase-locked loop of FIG. 4 can be reduced by the incorporation of a synchronization acquisition aid 100 as shown in FIG. 9(a). As shown, the synchronization acquisition aid receives the COUNT1 signal from binary phase detector 42 which represents the timing error between the data symbol timing epoch and the local symbol clock. The acquisition aid generates a SET signal to DCO 46 for setting the symbol clock to a predetermined state when the conditions described hereinbelow are satisfied.

Figure 9B:
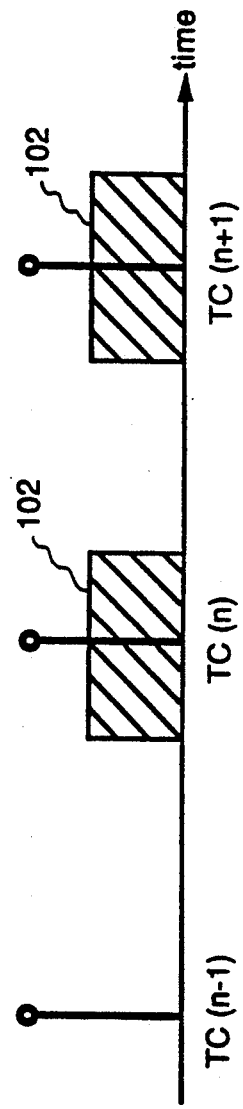
FIG. 9(b) graphically illustrates the acquisition aid lock window.
Figure 10:
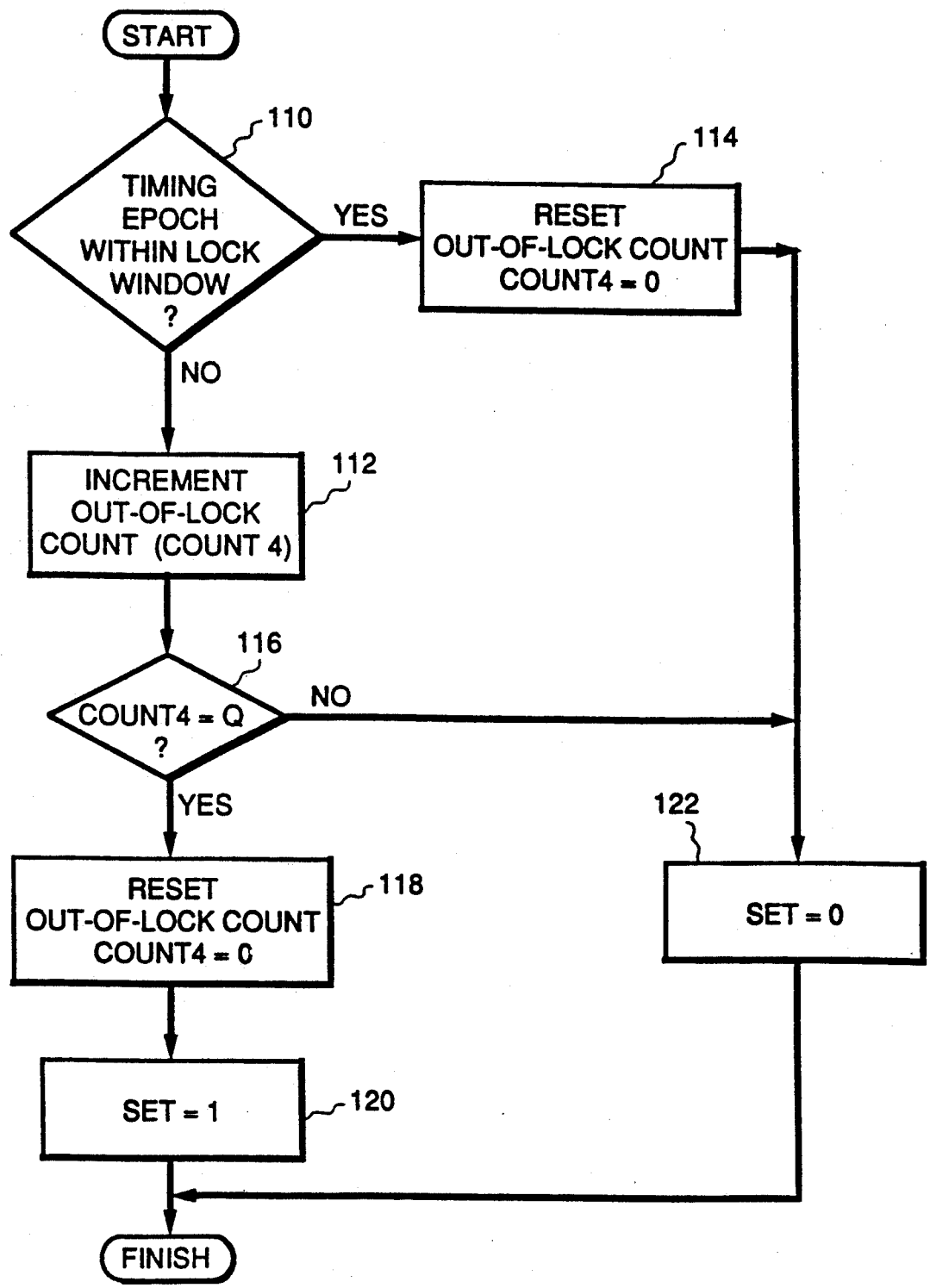
FIG. 10 is a flow chart showing operation of the acquisition aid of FIG. 9(b).

In operation, as represented by the flow chart of FIG. 10, the synchronization acquisition aid: (1) observes the timing error between the logic level transitions in the data and the estimated symbol clock generated by DCO 46 (FIG. 4); (2) determines in step 110 whether the estimated symbol clock timing epoch lies within a specified lock window 102, as shown in FIG. 9(b); and (3) increments an out-of-lock count COUNT4 in step 112 if the occurrence of the estimated clock lies outside of this lock window or resets the out-of-lock count in step 114 if COUNT4 if it lies therewithin. In FIG. 9(b), TC(n) is defined as the actual symbol timing epoch of the nth symbol. In step 116, the out-of-lock count COUNT4 is compared to an out-of-lock indication threshold Q. If the local estimate of the symbol clock lies outside of the lock window 102 (FIG. 9(b)) a predetermined number of consecutive times, as specified by the out-of-lock indication threshold Q, the SET signal is set equal to logic level one and is sent to the DCO to set the DCO's accumulator to a predetermined state. In particular, DCO 46 (FIG. 7) is modified so that accumulator 62 has a control input SET (as shown in phantom in FIG. 7) from acquisition aid 100 that allows accumulator 62 to be loaded with a predetermined count when the out-of-lock count has reached the out-of-lock indication threshold Q. Thus when COUNT4=Q, the DPLL is pulled into synchronism by adjusting the phase of the symbol clock to be in phase-lock with the most recent data-derived pulse from the level-transition detector. On the other hand, if the out-of-lock indication threshold Q has not been reached, the SET sequence to the DCO from acquisition aid 100 remains constant, i.e., at logic level zero, so that the DCO is unaffected by the acquisition aid, as indicated by step 122 in the flow chart of FIG. 10.

Advantageously, the symbol synchronizer of the present invention may be implemented using either VLSI technology or microprocessor code.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. A symbol synchronizer, comprising:

one-bit quantization means for receiving a sampled baseband signal in a predetermined digital signalling format and generating a binary-valued data sequence therefrom;

level-transition detection means for detecting logic level transitions in said binary-valued data sequence, said level-transition detection means including logic means for masking transitions in said data sequence that do not occur at a predetermined timing offset from the symbol timing epochs thereof and for generating a transition pulse sequence comprising logic pulses at the symbol rate of said data sequence and at said predetermined timing offset from the symbol timing epochs, said predetermined timing offset being on the interval $$\left[\frac{-T}{2}, \frac{T}{2}\right],$$

depending on said digital signalling format, where T is the symbol period; and a binary-quantized digital phase-locked loop for receiving the transition pulse sequence from said level-transition detection means and generating a stable symbol clock therefrom.

2. The symbol synchronizer of claim 1 wherein said sampled signal is in a Manchester signalling format, said predetermined timing offset being equal to zero.

3. The symbol synchronizer of claim 1 wherein said sampled signal is in a non-return-to-zero signalling format, said predetermined timing offset being equal to one-half symbol.

4. The symbol synchronizer of claim 1 wherein said logic means comprises:

first delay means for delaying said data sequence by one sample interval;

exclusive-OR gate means for receiving said data sequence and the output signal from said first delay means and performing an exclusive-OR function thereon;

multivibrator means for receiving the output signal from said exclusive-OR gate means and generating an output pulse sequence having a predetermined pulse duration depending on said digital signalling format;

second delay means for receiving the output pulse sequence from said multivibrator means and delaying said output pulse sequence by one sample interval;

inverting means for receiving the output signal from said second delay means and generating an inverted signal therefrom; and AND-gate means for receiving said inverted signal and the output pulse sequence from said multivibrator means and performing a logical-AND function thereon.

5. The symbol synchronizer of claim 1, further comprising acquisition aiding means for aiding the acquisition of phase-lock by said digital phase-locked loop, comprising:

means for determining whether the symbol clock pulses generated by said phase-locked loop are within a predetermined lock window;

means for incrementing an out-of-lock counter each time a symbol clock pulse is not within said lock window; and means for pulling said digital phase-locked loop into synchronization by adjusting the phase of said symbol clock to be in phase-lock with the most recent data-derived pulse from said level-transition detecting means whenever said out-of-lock counter has reached an out-of-lock indication threshold.

6. A symbol synchronizer, comprising:

one-bit quantization means for receiving a sampled baseband signal in a predetermined digital signalling format and generating a binary-valued data sequence therefrom;

level-transition detection means for detecting logic level transitions in said binary-valued data sequence, said level-transition detection means including logic means for masking transitions in said data sequence that do not occur at a predetermined timing offset from the symbol timing epochs thereof and for generating a transition pulse sequence comprising logic pulses at the symbol rate of said data sequence and at said predetermined timing offset from the symbol timing epochs, said predetermined timing offset being on the interval $$\left[\frac{-T}{2}, \frac{T}{2}\right],$$

depending on said digital signalling format, where T is the symbol period; and a binary-quantized digital phase-locked loop for receiving the transition pulse sequence from said level-transition detection means and generating a stable symbol clock therefrom, said phase-locked loop including:

(a) a digitally controlled oscillator for generating a symbol clock signal;

(b) phase detecting means for comparing the symbol clock signal from said digitally controlled oscillator to the transition pulse sequence from said level-transition detection means, said phase detecting means including counting means for determining the timing difference between the symbol clock signal and the pulses of the transition pulse sequence, said counting means being enabled by the symbol clock pulses, and said counting means being reset by the transition pulse sequence, said phase detecting means further including count decoding means for receiving said timing difference from said counting means and generating a lead signal if the symbol clock leads the transition pulse sequence and generating a lag signal if the symbol clock lags the transition pulse sequence; and (c) a random walk filter for receiving the lead and lag signals from said phase detecting means, said filter including an up/down counting means for incrementing a filter count upon receipt of a lag signal and for decrementing a filter count upon receipt of a lead signal, said filter further including count decoding means for receiving said filter count and generating advance and retard signals to said digitally controlled oscillator for respectively advancing and retarding the phase of the symbol clock based on said timing difference.

7. The symbol synchronizer of claim 6 wherein said sampled signal is in a Manchester signalling format, said predetermined timing offset being equal to zero.

8. The symbol synchronizer of claim 6 wherein said sampled signal is in a non-return-to-zero signalling format, said predetermined timing offset being equal to one-half symbol.

9. The symbol synchronizer of claim 6 wherein said logic means comprises:

first delay means for delaying said data sequence by one sample interval;

exclusive-OR gate means for receiving said data sequence and the output signal from said first delay means and performing an exclusive-OR function thereon;

multivibrator means for receiving the output signal from said exclusive-OR gate means and generating an output pulse sequence having a predetermined pulse duration depending on said digital signalling format;

second delay means for receiving the output pulse sequence from said multivibrator means and delaying said output pulse sequence by one sample interval;

inverting means for receiving the output signal from said second delay means and generating an inverted signal therefrom; and AND-gate means for receiving said inverted signal and the output pulse sequence from said multivibrator means and performing a logical-AND function thereon.

10. The symbol synchronizer of claim 6, further comprising acquisition aiding means for aiding the acquisition of phase-lock by said digital phase-locked loop, comprising:

means for determining whether the symbol clock pulses generated by said phase-locked loop are within a predetermined lock window;

means for incrementing an out-of-lock counter each time a symbol clock pulse is not within said lock window; and means for pulling said digital phase-locked loop into synchronization by adjusting the phase of said symbol clock to be in phase-lock with the most recent data-derived pulse from said level-transition detecting means whenever said out-of-lock counter has reached an out-of-lock indication threshold.

11. A method for deriving a symbol clock reference from a sampled signal, comprising:

generating a binary-valued data sequence from a sampled baseband signal in a predetermined digital signalling format;

detecting logic level transitions in said binary-valued data sequence by masking transitions in said data sequence that do not occur at a predetermined timing offset from the symbol timing epochs thereof and generating a transition pulse sequence comprising logic pulses at the symbol rate of said data sequence and at said predetermined timing offset from the symbol timing epochs, said predetermined timing offset being on the interval $$\left[\frac{-T}{2}, \frac{T}{2}\right],$$

depending on said digital signalling format, where T is the symbol period; and providing said transition pulse sequence to a binary-quantized digital phase-locked loop for generating a stable symbol clock therefrom.

12. The method of claim 11 wherein said sampled signal is in a Manchester signalling format, said predetermined timing offset being equal to zero.

13. The method of claim 11 wherein said sampled signal is in a non-return-to-zero signalling format, said predetermined timing offset being equal to one-hale symbol.

14. The method of claim 11 wherein the step of detecting logic level transitions in said binary-valued data sequence comprises:
    delaying said data sequence by one sample interval;
    performing an exclusive-OR function on said data sequence and the delayed data sequence;
    generating an output pulse sequence from the result of said exclusive-OR function, said output pulse sequence having a predetermined pulse duration depending on said digital signalling format;
    delaying said output pulse sequence by one sample interval;
    inverting the delayed output pulse sequence; and
    performing a logical-AND function on the output pulse sequence and the inverted and delayed output pulse sequence.

15. The method of claim 11, further comprising the step of aiding the acquisition of phase-lock by said digital phase-locked loop, comprising:
    determining whether the symbol clock pulses generated by said phase-locked loop are within a predetermined lock window;
    incrementing an out-of-lock counter each time a symbol clock pulse is not within said lock window; and
    pulling said digital phase-locked loop into synchronization by adjusting the phase of said symbol clock to be in phase-lock with the most recent data-derived pulse from said transition pulse sequence whenever said out-of-lock counter has reached an out-of-lock indication threshold.

16. The method of claim 11 wherein the step of providing said transition pulse sequence to a binary-quantized digital phase-locked loop for generating a stable symbol clock, comprises:
    comparing said symbol clock to said transition pulse sequence and determining the timing difference therebetween using a counter that is enabled by the pulses from said symbol clock and is reset by the pulses from said transition pulse sequence;
    generating a lead signal if said symbol clock leads said transition pulse sequence and generating a lag signal if said symbol clock lags said transition pulse sequence;
    providing the lead and lag signals to a random walk filter for generating a filter count;
    incrementing said filter count upon receipt of a lag signal and decrementing said filter count upon receipt of a lead signal; and
    generating advance and retard signals corresponding to said filter count for respectively advancing and retarding the phase of said symbol clock based on said timing difference.

* * * * *